United States Patent Office 3,358,039
Patented Dec. 12, 1967

3,358,039
KETALS OF HEXACHLOROCYCLOPENTADIENE AND PROCESS FOR THEIR PREPARATION
Wen-Hsuan Chang, Gibsonia, Pa., assignor to Pittsburgh Plate Glass Company, Pittsburgh, Pa., a corporation of Pennsylvania
No Drawing. Filed Nov. 1, 1962, Ser. No. 234,847
13 Claims. (Cl. 260—611)

This invention relates to certain polyol derivatives of tetrahalocyclopentadiene and to their preparation, and more particularly to such polyols in which two hydroxyorganoxy groups are attached to the cyclopentadiene ring.

The reaction of hexachlorocyclopentadiene with an excess of ethylene glycol has been reported heretofore by Newcomer and McBee in the Journal of the American Chemical Society, volume 71, page 946 (1949). The product of this reaction, according to the authors was 1,2,3,4, 11,12,13,14 - octachloro - 6,9,15,18 - tetraoxadispiro[4.4. 4.4]-1,3,11,13-octadecatetrane having the formula:

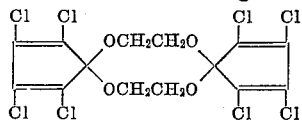

It has now been found, and it is upon this discovery that the present invention is in large part predicated, that the reaction of hexahalocyclopentadiene with a polyol having at least two non-adjacent hydroxyl groups, i.e., hydroxyl groups attached to non-adjacent carbon atoms, follows a completely different course from that which takes place in the case of ethylene glycol according to the above publication, and results in products of a different type than that set forth above.

The nature of the product obtained in accordance with this invention depends upon the ratio of reactants present. If an excess of polyol, i.e., more than two moles per mole of hexahalocyclopentadiene, is used there is produced the bis(hydroxyorganoxy) derivative in which only one hydroxyl group of each polyol is reacted with the hexahalocyclopentadiene. Thus, for example, the reaction of 1,4-butanediol with hexachlorocyclopentadiene takes place in accordance with the following equation when an excess of 1,4-butanediol is present:

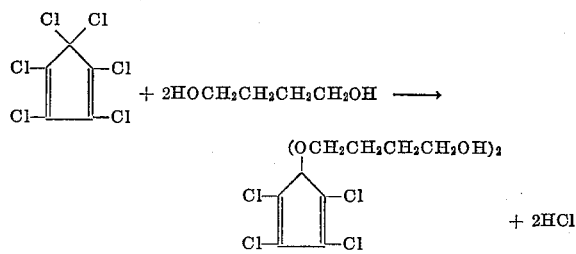

This product is 5,5-bis(4-hydroxybutoxy)-1,2,3,4-tetrachloro-1,3-cyclopentadiene.

When, however, the molar ratio of hexahalocyclopentadiene to polyol is at least 1 to 2, that is, when stoichiometric or excess hexahalocyclopentadiene over the stoichiometry of the above reaction is present, polyketals are obtained. These polymeric products have recurring groups in which a cyclopentadiene nucleus is attached to each oxygen from the hydroxyl groups of the polyol. Using again the reaction of 1,4-butanediol with hexachlorocyclopentadiene to illustrate, the product obtained when an excess of hexachlorocyclopentadiene is present is as follows:

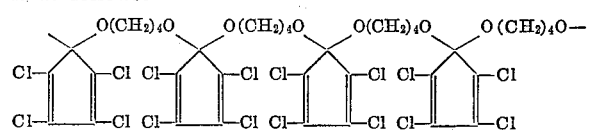

The above reactions are applicable to any polyol having at least two hydroxyl groups which are attached to non-adjacent carbon atoms. Putting this another way, the polyol must have at least two hydroxyl groups separated by at least three carbon atoms. Some examples of the polyols included within the scope of this invention are saturated aliphatic polyols such as 1,3-butanediol, 1,3-propanediol, 1,4-butanediol, 3-methyl-1,3-butanediol, 1,4-pentanediol, 1,5-pentanediol, 1,6-hexanediol, 1,10-decanediol, 2-methyl-2,4-pentanediol, 2,2-dimethyl-1,3-propanediol, trimethylolpropane, 1,2,6-hexanetriol, pentaerythritol and trimethylolpropane monoalkyl and aryl ethers; saturated alicyclic polyols such as 1,4-bis(hydroxymethyl)cyclohexane; and mixed aryl-alkyl polyols such as p-xylyleneglycol. Unsaturated aliphatic polyols, such as 1,4-butenediol and pentaerythritol allyl ethers, and unsaturated alicyclic compounds, such as 1,5-bis(hydroxyethyl)cyclohexene-1,2, are also contemplated. In certain instances such compounds react further through their unsaturated linkages to produce relatively complex products, at least in part. There are also included polyols which contain ether linkages, such as diethylene glycol, triethylene glycol, polyethylene glycols (Carbowax) and similar polyalkylene glycols. In each instance the polyol must have at least three carbon atoms. For most purposes it is preferred to use polyols of 3 to 30 carbon atoms.

The preferred polyols for use in the invention at present are the aliphatic polyols having 3 to 20 carbon atoms, since these are the most readily available and provide products having desirable properties.

When two moles of polyol or less per mole of hexahalocyclopentadiene are employed, a new type of polymeric ketal is produced. These polyketals have recurring units of the following structure:

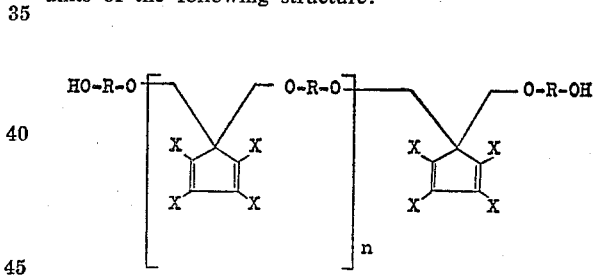

where X is halogen and R is an organic radical in which the ketal oxygens are separated by at least three carbon atoms, and which is derived by splitting of the hydrogen atoms from two non-adjacent hydroxyl groups of the polyol. Thus, when the polyol is a saturated aliphatic polyol, R is alkylene; unsaturated aliphatic polyols produce compounds in which R is alkenylene; the R groups are cycloalkylene or cycloalkenylene when the polyol is alicyclic; and the compounds contain aralkylene groups when mixed aryl-alkyl polyols are employed. Polyols such as the polyalkylene glycols result in alkoxy-alkylene substituted products. Polyols having more than two hydroxyl groups produce compounds having the above types of R groups but which are hydroxyl substituted. Since the polyols contain at least two non-adjacent hydroxyls, in each case the R group is substituted with at least two oxygens which are attached to the cyclopentadiene molecule, i.e., ketal oxygens, and which are separated by at least three carbon atoms.

In the above structure representing the polyketals, the value of $n$ varies considerably with the nature of the reactants, the ratio of reactants employed, and the reaction conditions; its average value may be as low as one or as high as one hundred or even higher.

The products of the reaction of a hexahalocyclopentadiene using an excess of polyol comprise a class of new monomeric compounds corresponding to the formula:

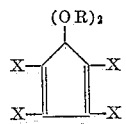

where X is halogen and R is an organic radical of at least 3 carbon atoms substituted with at least one hydroxyl group in at least the 3-position with respect to the ketal oxygen. The OR substituent in the above class of compounds is derived by splitting off a hydrogen atom from one of the hydroxyl groups of the polyol. The organic radical, then, depends upon the polyol used in the same manner as in the case of the polyketals above, except that only one hydroxyl group is reacted. The organic radical is thus a mono- or polyhydroxyl substituted derivative of an alkyl group, an alkenyl group, a cycloalkyl group, a cycloalkenyl group, an aralkyl group, an alkoxyalkyl group, depending upon whether the polyol is a saturated aliphatic polyol, an unsaturated aliphatic polyol, an alicyclic polyol, an aryl substituted alkyl polyol, or a polyalkylene ether glycol. In each instance, the organic radical in the compounds formed using an excess of polyol remains substituted with at least one hydroxyl group, and since the polyol utilized to make the compound has hydroxyls on non-adjacent carbon atoms, at least one hydroxyl group remaining is in at least the 3-position with respect to the ketal oxygen. In the preferred embodiments of the invention, in which the polyol is a saturated aliphatic polyol, the products are 5,5-bis(hydroxyalkoxy)-1,2,3,4-tetrahalocyclopentadienes; in these products R in the above formula is hydroxyalkyl.

A surprising feature of the reactions which form the basis for this invention is that not only do the reactions take place in a completely different manner from that which the prior art indicates takes place with ethylene glycol, but also that when carried out using an excess of the polyol, only one of the hydroxyl groups of the polyol reacts with the hexahalocyclopentadiene and the other hydroxyls remain essentially unreacted. Because of this, monocarboxylic ester derivatives can be produced by reaction with a monocarboxylic acid or anhydride; in these derivatives R in the above formula is substituted with the ester group in place of the hydroxyl group.

In order to obtain the monomeric products of the class set forth above, there must be present more than two moles of polyol per mole of hexahalocyclopentadiene, since the stoichiometry of the reaction requires two moles of polyol per mole of hexahalocyclopentadiene.

The reactions above are base-catalyzed and thus are carried out in the presence of a base. While essentially any base, as that term is understood in the art, can be used, it is preferred to employ inorganic bases including the hydroxides, alkoxides and oxides of metals such as potassium, sodium, calcium and the like. The metals themselves, i.e., metallic sodium, for example, can also be used, and provide quite satisfactory results. Organic bases such as amines are less satisfactory since they tend to reduce the yield by producing side reactions which compete with the desired reaction. The most desirable bases, economically speaking, are the hydroxides of alkali metals and these also provide the best results. Therefore, these bases are almost always utilized in practicing the method of this invention. While the amount of base present is not critical, in order to achieve complete reaction and a satisfactory rate of reaction it is preferred to use about two moles of the base per mole of hexahalocyclopentadiene. It appears, however, that both chlorines on the 5-carbon of one hexahalocyclopentadiene molecule are replaced before another molecule reacts. Thus, even very small amounts of base result in the desired products, although in such cases the reaction is slow and yields are somewhat reduced.

The other reaction conditions are similarly not critical in carrying out the process to produce the monomeric and polymeric products set forth above. For example, the reaction can be carried out at ordinary room temperature (about 25° C.), or below, say 0° C., although somewhat elevated temperatures may be used in order to induce faster rates of reaction. Temperatures of 70° C. to 80° C. are often employed for this purpose, although higher temperatures, up to one hundred degrees or higher, can be used if desired, depending, of course, upon the stability of the particular reactants and products involved in the reaction. If desired, the reaction can be carried out in the presence of a solvent. Quite often the excess polyol or hexahalocyclopentadiene is used as the only solvent, although other inert solvents, such as ethylene glycol dimethylether, diethylene glycol dimethylether, tetrahydrofuran, acetamide and the like, can be used with similar effectiveness. When the polyol employed is a solid, it is generally desirable to have such a solvent present. Any inert solvent in which the reactants and products have sufficient solubility can be so employed.

There are set forth below several examples which illustrate the method of producing the new monomeric compounds of this invention and the manner in which such compounds were isolated and identified. These examples are, of course, given by way of illustration only, and should not be construed as limiting the invention to their particular details. All parts and percentages set forth, as is true throughout this specification, are by weight unless otherwise specified.

EXAMPLE I

*5,5-bis(3-hydroxybutoxy)-1,2,3,4-tetrachloro-1,3-cyclopentadiene*

To a four-necked, two liter round bottom flask equipped with thermometer, dropping funnel, stirrer and condenser were added 5.5 moles of 1,3-butanediol (495 grams) and 1 mole of metallic sodium (23.0 grams) in portions at 90° C. until a homogeneous solution was obtained. Hexachlorocyclopentadiene (204.5 grams, 0.75 mole) was added dropwise into the solution with external cooling at 32–45° C. After the addition, the mixture was stirred at 45° C. for 63 hours. The reaction product was acidic. After filtration, half of the reaction product was neutralized with 10 percent sodium carbonate and washed with water, dried in 0.05 mm. vacuum and then flash distilled in a round bottom flask heated with a 200° C. oil bath. The distillate, 105.7 grams was redistilled; the product 5,5-bis(3 - hydroxybutoxy)-1,2,3,4-tetrachloro-1,3-cyclopentadiene, was recovered chiefly in the fraction boiling at 170° C. at 0.06 mm. pressure. The ultraviolet light absorption of the product indicated the presence of the 5,5-dialkoxy-1,2,3,4-tetrachlorocyclopentadiene system. Its chemical analysis, calculated for $C_{13}H_{18}Cl_4O_4$, was as follows:

Calculated: C, 41.08%; H, 4.77%; Cl, 37.31%
Found: C, 41.06%; H, 4.70%; Cl, 38.23%
Hydroxyl value: Calculated, 296; found, 276
Bromine No.: Theoretical, 380; found, 353.

In order to utilize the unreacted hexachlorocyclopentadiene the second half of the crude reaction product was added to 0.50 mole of solid potassium hydroxide. The temperature rose to 68° C. even with external water cooling. This mixture was stirred at room temperature for 24 hours and was then added to 500 ml. of water. The organic layer was neutralized, washed and dried. This product was flash distilled and the distillate was redistilled.

The product (68.4 grams) was obtained at 168° C. at 0.05 mm.

That both the hydroxy groups of the product were secondary was shown by formation of iodoform by reaction of the product with iodine in basic solution. Similarly, that the compounds produced in the above manner are substituted in the 5,5-position was demonstrated by acid hydrolysis of such compounds to produce the tetrachlorocyclopentadienone dimer, which was in turn identified by infrared analysis and by preparation of perchloroindenone therefrom.

Confirming the identification of the above product was its diacetate derivative, which was prepared as follows:

EXAMPLE II

*5,5-bis(3-acetoxybutoxy)-1,2,3,4-tetrachloro-1,3-cyclopentadiene*

A mixture of 16.5 grams (0.0435 mole) of the 5,5-bis (3 - hydroxybutoxy) - 1,2,3,4 - tetrachloro-1,3-cyclopentadiene prepared above, 50 grams (0.49 mole) of acetic anhydride and 2.0 grams of anhydrous sodium acetate was heated on a steam bath for 2 hours. The product was washed with water and sodium carbonate solution, dried and distilled, the fraction boiling at 164° C. at 0.20 mm. Nineteen (19) grams was redistilled and gave an 18.0 gram fraction, boiling point 146° C. at 0.035 mm.

Analysis (calculated for $C_{17}H_{22}Cl_4O_6$).—Calculated: C, 43.99%; H, 4.78%; Cl, 30.55%. Found: C, 44.03%; H, 4.72%; Cl, 30.93%.

EXAMPLE III

*5,5-bis(3-hydroxypropoxy)-1,2,3,4-tetrachloro-1,3-cyclopentadiene*

To a three-necked, three liter flask equipped with stirrer, thermometer and dropping funnel were added 760 grams (10.0 moles) of 1,3-propanediol and 273 grams (1.0 mole) of hexachlorocyclopentadiene. A solution of 86 grams (2.0 moles) of sodium hydroxide in 75 ml. of water was then added dropwise to the solution with external cooling. This mixture was stirred at 25-27° C. for 68 hours. The product was filtered and water was added to the filtrate, whereupon an oil precipitated which was dissolved in ether and washed with water until neutral. When the solvent was removed at 50° C. in vacuo, the residue was 244 grams. A part of the product was neutralized with aqueous sodium bicarbonate and washed with water and distilled. The fraction distilled over at 180° C. at 0.15 mm. was redistilled and the fraction collected at 176° C. to 180° C. at 0.15 mm. crystallized on standing. It was recrystallized from ether-ligroin (boiling point 60-78° C.) twice to give a solid melting at 64.5-66° C. This was identified as 5,5-bis(3-hydroxypropoxy) - 1,2,3,4 - tetrachloro - 1,3 - cyclopentadiene.

Analysis (calculated for $C_{11}H_{14}Cl_4O_4$).—Calculated: C, 37.53%; H, 4.01%; Cl, 40.29%. Found: C, 37.54%; H, 4.09%; Cl, 40.43%.

EXAMPLE IV

*5,5-bis(3-acetoxypropoxy)-1,2,3,4-tetrachloro-1,3-cyclopentadiene*

The diacetate of the product of Example III was prepared by heating 21.0 grams of the above crude product with 21 ml. of acetic anhydride and 1.0 gram of anhydrous sodium acetate on a steam bath for one hour. The product was filtered to remove the insoluble salts and evaporated to dryness on a steam bath in vacuo. The pot residue was then dissolved in ligroin and filtered through a silica gel packed column. The filtrate was dried and distilled to give 13.0 grams of 5,5-bis(3-acetoxypropoxy) - 1,2,3,4 - tetrachloro-1,3-cyclopentadiene, boiling point 170° C. at 0.12 mm.

Analysis (calculated for $C_{15}H_{18}Cl_4O_6$).—Calculated: C, 41.30%; H, 4.16%; Cl, 32.52%. Found: C, 41.75%; H, 4.03%; Cl, 33.29%.

EXAMPLE V

*5,5-bis(2-hydroxymethyl-2-methylpropoxy)-1,2,3,4-tetrachloro-1,3-cyclopentadiene*

A flask was charged with 720 grams (6.96 moles) neopentyl glycol, 273 grams (1 mole) of hexachlorocyclopentadiene and 500 ml. dimethoxyethane. Solid potassium hydroxide (132 grams, 2 moles, 85% pure) was added in portions with stirring and cooling at 26-33° C. This mixture was stirred at room temperature overnight; the pH was then 7. The mixture was washed with water and 840 ml. of product was obtained, 20 ml. of which was distilled.

The expected substituted cyclopentadiene, collected at 172° C. at 0.15 mm. pressure, was redistilled and boiled at 160° C. at 0.03 mm. It solidified on standing. After recrystallization twice from ligroin (boiling point 60-78° C.), the product melted at 56.5° C.

Analysis (calculated for $C_{15}H_{22}Cl_4O_4$).—Calculated: C, 44.14%; H, 5.43%; Cl, 34.74%. Found: C, 44.35%; H, 5.68%; Cl, 34.56%.

EXAMPLE VI

*5,5-bis(2-acetoxymethyl-2-methylpropoxy)-1,2,3,4-tetrachloro-1,3-cyclopentadiene*

One-eighth of the reaction product of Example V was mixed with 75 ml. of acetic anhydride and one gram of anhydrous sodium acetate and heated on a steam bath for 5 hours. The excess acetic anhydride was removed by vacuum distillation and the residue was dissolved in ligroin and filtered through a silica gel packed column. The filtrate was dried and distilled to give 29 grams of product with boiling point 70-180° C. at 0.04 mm., which solidified readily. After recrystallization from ligroin (boiling point 60-78° C.) three times, this product melted at 73.5-74.5° C. and was identified as 5,5-bis(2-acetoxymethyl - 2 - methylpropoxy - 1,2,3,4 - tetrachloro-1,3-cyclopentadiene.

Analysis (calculated for $C_{19}H_{26}Cl_4O_6$.—Calculated: C, 46.36%; H, 5.32%; Cl, 28.81%. Found: C, 47.07%; H, 5.35%; Cl, 28.45%.

EXAMPLE VII

*5,5-bis(4-hydroxybutoxy)-1,2,3,4-tetrachloro-1,3-cyclopentadiene*

Eight moles (720 grams) of 1,4-butanediol were mixed with two moles of sodium (46.0 grams) at 85-105° C. and the solution was added dropwise into a three liter flask containing 1 mole of hexachlorocyclopentadiene (272.0 grams). The reaction was exothermic and external cooling was used to keep the reaction temperature at 33° C. After stirring for three days, the reaction mixture was acidic. To this reaction product, one liter of water was added; chloroform was added to facilitate the separation into layers. The organic layer was neutralized with 10 percent sodium carbonate, washed with water, and dried in vacuum (0.5 mm.) for 5 hours. A 40.0 gram portion was distilled and the fraction boiling at 200 to 204° C. at 0.07 mm. pressure was redistilled. The product, 5,5-bis(4-hydroxybutoxy) - 1,2,3,4 - tetrachloro-1,3-cyclopentadiene, was collected at 186° C. at 0.035 mm.

The product was identified by ultraviolet light absorption, chemical analysis, and by preparation of its diacetate derivative as in the above examples.

EXAMPLE VIII

*5,5-bis(5-hydroxy-3-oxapentoxy)-1,2,3,4-tetrachloro-1,3-cyclopentadiene*

To a two-liter, round bottom flask equipped with stirrer and thermometer was added a solution of 636.7 grams (6.0 moles) of diethylene glycol and 168 grams (3.0 moles, 85 percent purity) of potassium hydroxide. Hexachlorocyclopentadiene (273 grams, 1.0 mole) was added dropwise at 44-47° C. while the reaction flask was cooled externally. The reaction mixture was then stirred at 25° C. for 16 hours. The product was extracted with ether and the ether layer washed and dried. Evaporation of the ether yielded 59.0 grams of 5,5-bis(5-hydroxy-3-oxapentoxy)-1,2,3,4-tetrachloro-1,3-cyclopentadiene. This product was not distillable under vacuum.

EXAMPLE IX

*5,5-bis[2,2-bis(hydroxymethyl)butoxy]-1,2,3,4-tetrachloro-1,3-cyclopentadiene*

Hexachlorocyclopentadiene (0.50 mole, 136 grams) was added to a solution of 670 grams (5.0 moles) of 1,1,1-trimethylolpropane and 64.4 grams (1 mole, 85 percent) of potassium hydroxide at 65–70° C. and stirred at this temperature for 17 hours. One liter of ligroin (boiling point 60–78° C.) was added to extract the unreacted hexachlorocyclopentadiene. This organic layer was separated and distilled to give 9.7 grams of hexachlorocyclopentadiene.

The product layer was then washed with water and ether and the ether layer was again washed three times with water and dried. Evaporation of the ether yielded 190.5 grams of a hard resinous product, identified as 5,5-bis[2,2-bis(hydroxymethyl)butoxy] - 1,2,3,4 - tetrachloro-1,3-cyclopentadiene.

EXAMPLE X

*5,5-bis(4-hydroxymethylcyclohexane-1-methoxy)-1,2,3,4-tetrachloro-1,3-cyclopentadiene*

Solid potassium hydroxide (66.2 grams, 1 mole, 85 percent purity) was added to a solution of 474 grams (3.3 moles) of 1,4-cyclohexanedimethanol, 136.5 grams (0.5 mole) of hexachlorocyclopentadiene and 300 ml. of dimethoxyethane at 30° C. There was no heat evolved; after stirring for 70 hours, the reaction mixture was neutral. Water was then added to precipitate the water insoluble material. The organic layer was washed with sodium chloride solution three times and dried. There were obtained 189 grams of crude product; the product was analyzed by infrared and ultraviolet examination.

As is discussed above, the polyols which are employed in this invention must have at least two hydroxyl groups separated by at least three carbon atoms in order to achieve the products of the class described. If the only hydroxyls are on adjacent carbon atoms, products of a completely different class are obtained, as disclosed in copending application Ser. No. 234,846 filed on the same day herewith. However, the polyol may have hydroxyls on adjacent carbon atoms in addition to those on non-adjacent carbons and the products are as described herein, although the yield may be reduced by the competing reaction taking place with the adjacent hydroxyl groups. Set forth below is an example of the reaction using such a polyol.

EXAMPLE XI

*5,5-bis(5,6-dihydroxyhexoxy)-1,2,3,4-tetrachloro-1,3-cyclopentadiene*

To a two-liter, three necked flask equipped with stirrer, thermometer and dropping funnel were added 675 grams (5 moles) of 1,2,6-hexanetriol and 64.4 grams (0.97 mole, 85 percent purtiy) solid potassium hydroxide in portions at 90–100° C. The solution was cooled and hexachlorocyclopentadiene (137.0 grams, 0.50 mole) was added dropwise at 23–28° C. while the flask was cooled externally. After the addition, the reaction mixture was stirred at 30° C. for 24 hours (pH was then 8). The product was extracted with 500 ml. of ligroin (boiling point 60–78° C.) to remove 19.2 grams of the unreacted hexachlorocyclopentadiene. Chloroform was added and the mixture was then washed with saturated sodium chloride solution till neutral. The solvent was removed in vacuum to give 148 grams of a mixture of 7(4′-hydroxybutyl)-1,2,3,4-tetrachloro-6,9-dioxaspiro[4,4]nonadiene and the desired product, 5,5 - bis(5,6-dihydroxy)-1,2,3,4-tetrachloro-1,3-cyclopentadiene. The products were analyzed by ultraviolet light absorption and infrared examination.

The above examples demonstrate the manner in which monomeric compounds are obtained by reacting a hexahalocyclopentadiene with an excess of polyol. The same reactions carried out as in the preceding examples but using not more than two moles of polyol per mole of hexahalocyclopentadiene produces the corresponding polyketal. Illustrating the manner in which the polyketals are produced are the following:

EXAMPLE XII

*2,3,4,5-tetrachloro-2,5-cyclopentadiene-1-one neopentyl glycol polyketal*

A three-necked, two liter round bottom flask equipped with stirrer and thermometer was charged with 104 grams (1.0 mole) of neopentyl glycol, 273 grams (1.0 mole) hexachlorocyclopentadiene and 300 ml. of dimethoxyethane. To this homogeneous mixture, solid potassium hydroxide (132.4 grams, 2.0 moles, 85 percent purity) was added in portions at 26–33° C. with external cooling. The mixture was stirred overnight. Water and ether were then added to the reaction mixture, which was slightly basic, and the ether layer was washed with water and steam distilled to remove the organic solvent and the trace amount of unreacted hexachlorocyclopentadiene. Water was then decanted off and the residue was dried over a steam bath in vacuo. There were obtained 280.5 grams of the above polyketal, as identified by ultraviolet light absorption, infrared spectrographic examination and chemical analysis. It had recurring units of the following structure:

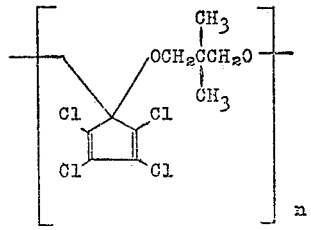

The average molecular weight of the product was determined to be 3520, indicating that the average value of $n$ was 10 to 11.

EXAMPLE XIII

*2,3,4,5-tetrachloro-2,5-cyclopentadiene-1-one-2,2-diethyl-1,3-propanediol polyketal*

To a two-liter, three necked round bottom flask equipped with stirrer and thermometer were added 132 grams (1.0 mole) of 2,2-diethyl-1,3-propanediol, 273 grams (1.0 mole) of hexachlorocyclopentadiene and 45 ml. of dimethoxyethane. Two moles (132.4 grams, 85 percent purity) of potassium hydroxide were added in portions at 25–28° C. and the mixture was stirred for 48 hours. Water and ligroin was added to the reaction mixture and the organic layer was separated, washed with aqueous sodium chloride until neutral, and filtered through a column packed with sodium sulfate and Celite. The filtrate was then evaporated to dryness at 110–120° C. at 0.2 mm. vacuum, yielding 301.0 grams of the above polyketal as identified by infrared and ultraviolet light absorption analysis. The average molecular weight of the polyketal based on end group analysis was 3700. The calculated chlorine content based on $(C_{12}H_{14}Cl_4O_2)_{11}$ is 42.3 percent, while the experimentally determined value of the product was 42.8 percent.

The polyketal is also obtained by carrying out the reaction as a two-step process in which the monomeric 1,2,3,4-tetrahalo-1,3-cyclopentadiene derivative is first produced by using excess polyol and then reacted with sufficient additional hexahalocyclopentadiene to make the molar ratio of the total reactants as described above. If desired, the monomeric compound may be isolated prior to reaction with the additional hexahalocyclopentadiene. The example below illustrates this manner of producing the polyketals.

EXAMPLE XIV

*2,3,4,5-tetrachloro-2,5-cyclopentadiene-1-one 1,4-butanediol polyketal*

Using the procedure of Example VII above, 5,5-bis-(4 - hydroxybutoxy) - 1,2,3,4 - tetrachloro - 1,3 - cyclopentadiene was produced and then 76 grams (0.2 mole) of the monomeric compound were added to a flask along with 150 ml. of dioxane, 54.6 (0.2 mole) of hexachlorocyclopentadiene and 26.4 grams (0.4 mole, 85 percent purity) of potassium hydroxide. After stirring for two hours, an additional 5.0 ml. of water was added to completely dissolve the potassium hydroxide. The mixture was stirred for another 48 hours; the pH was then 7.5. After addition of water and ether, the ether layer was washed with water and evaporated to give 92 grams of the above polyketal, which was made up of units as follows:

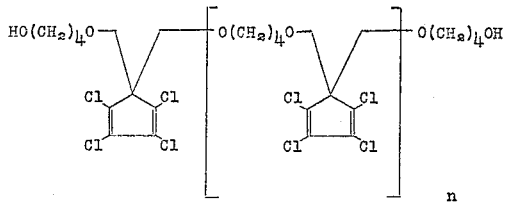

While the above examples demonstrate the invention using hexachlorocyclopentadiene, other hexahalocyclopentadienes, such as hexabromocyclopentadiene, are also contemplated for use herein and produce corresponding halogen-containing products in accordance with the examples above. For instance, the reaction of hexabromocyclopentadiene with 1,3-butanediol produces 5,5-bis(3-hydroxybutoxy) - 1,2,3,4 - tetrabromo - 1,3 - cyclopentadiene using an excess of the polyol and 2,3,4,5-tetrabromo-2,5-cyclopentadiene-1-one 1,4-butanediol polyketal when an excess of hexabromocyclopentadiene is employed. There may also be employed the similar compounds in which different halogens are contained in the same molecule, such as 1,2 - dibromo - 3,4,5,5 - tetrachlorocyclopentadiene and 2,3 - dibromo - 1,4,5,5 - tetrachlorocyclopentadiene.

The new monomeric compounds of this invention are useful in applications wherein their combination of high halogen content with polyhydroxy functionality provides advantageous properties. For instance, they can be used in place of other polyols in making polyurethane foams, and the foams produced have unique properties, such as a high degree of fire retardancy. Particularly preferred for such uses are compounds produced from polyols with three or more hydroxyl groups, since rigid foams can be produced therefrom. The compound can be used as such in producing foams by any conventional method, or it can be first mixed or reacted with another unsaturated monomer or polymer and the resultant solution or product used in making the foam. The other unsaturated material may contain halogen, phosphorous, antimony, sulfur, etc.; such substituents aid in imparting properties such as fire retardancy to the foam. The following examples demonstrate such foamed materials using these new compounds.

EXAMPLE XV

*Foam produced from 5,5-bis[2,2-bis(hydroxymethyl) butoxy]-1,2,3,4-tetrachloro-1,3-cyclopentadiene*

Ninety (90) parts of the above compound, made from trimethylolpropane and hexachlorocyclopentadiene in accordance with the method of this invention, were mixed at 65–70° F. with one part of a 1 to 0.4 mixture of dimethylethanolamine and triethylene diamine and 30 parts of trichlorofluoromethane (Freon-11). To this mass there was added with agitation 100 parts of a prepolymer made of 20 parts of toluene diisocyanate, 79 parts of a sucrose polyether polyol and one part of an organosilicon fluid surfactant (Union Carbide L–5310). There was produced a foam having a density of 1.8 and which was fire-retardant when compared with a conventional polyol-isocyanate foam.

EXAMPLE XVI

*Foam produced from 5,5 - bis[2,2 - bis(hydroxymethyl) butoxy] - 1,2,3,4-tetrachloro-1,3-cyclopentadiene modified with diallyl chloromethylphosphonate*

Three hundred sixty-eight parts (368) of the above compound were mixed with 165 parts of diallyl chloromethylphosphonate and one part of hydroquinone and heated with stirring to 100° C. The hydroxyl value of the resin produced was 266.2. A mixture of 127 parts of this resin, 37 parts of trichlorofluoromethane (Freon-11), one part of organosilicon fluid emulsifier (Union Carbide L–5310) and 2 parts of dimethylethanolamine-triethylene diamine (ratio 1 to 0.4) was made up and mixed thoroughly with 100 parts of a commercial grade of phenyl diisocyanates (Nacconate 40–40). There was produced a foam having good fire retardancy, good dimensional stability and low water absorption. On aging, the foam gained in strength and fire retardancy.

Monocarboxylic acid esters of the monomeric compounds above such as the acetate, benzoate, propionate, formate, nitrobenzoate and the like, are produced as are the acetate derivatives in the above examples and are also useful, for instance, in organic synthesis. In many instances, such esters provide the best means of isolating and purifying the monomeric compound, which is easily regenerated from the ester by hydrolysis.

The polyketals as produced herein also are useful in several ways. For example, they can be cured by reacting them with another ethylenically unsaturated monomer having two or more double bonds. When so cured they produce hard resinous products which are useful, for example, in making films and coatings. The following examples illustrate their use in this manner.

EXAMPLE XVII

*Curing of 2,3,4,5-tetrachloro-2,5-cyclopentadiene-5-one 1,4-butanediol polyketal with triallylphosphate*

The polyketal was dissolved in twice the amount of hexachlorocyclopentadiene. This was mixed with an equal amount of triallyl phosphate and the mixture was heated at 350° F. for one hour to give a smooth, hard film.

EXAMPLE XVIII

*Curing of 2,3,4,5-tetrachloro-2,5-cyclopentadiene-5-one neopentyl glycol polyketal with cyclododecatriene*

A solution of 6.0 grams of 2,3,4,5-tetrachloro-2,5-cyclopentadiene-5-one neopentyl glycol polyketal, 4.0 grams of cyclododecatriene and 3 ml. of chloroform was heated at 250–300° F. for 16 hours. The product was a hard, non-tacky resin.

Although in the interests of clarity the invention is described and exemplified herein using a single polyol in each instance, it should be noted that mixtures of the reactants can also be employed. In many instances, particularly when polymeric products are desired, it may be preferred to use, for example, a mixture of polyols of differing types and reactivities so as to produce a product of specific properties. The reaction carried out using mixtures of reactants, and the resulting products, are to be considered within the scope of the invention as heretofore described and hereinafter claimed.

According to the provisions of the patent statutes, there are described above the invention and what are now considered to be its best embodiments. However, within the scope of the appended claims, it is to be understood that the invention may be practiced otherwise than as specifically described.

I claim:
1. A compound of the formula:

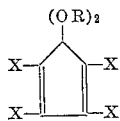

where X is selected from the group consisting of chlorine and bromine and R is an organic radical containing 3 to 20 carbon atoms selected from the class consisting of hydroxyl-substituted members of the group consisting of alkyl, cycloalkyl, and alkoxyalkyl radicals, said hydroxyl substituents being the sole reactive functional substituent on said radicals, all hydroxyl groups in said radical being in at least the 3-position with respect to the ketal oxygen.

2. A composition as in claim 1 wherein R is hydroxyl-substituted alkyl.

3. A compound as in claim 1 wherein R is hydroxyl-substituted alkoxyalkyl.

4. An open-chain polyketal consisting essentially of recurring units of the structure:

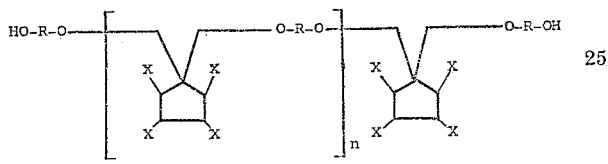

where $n$ is 1 to 100, where X is selected from the group consisting of chlorine and bromine and R is an organic radical having 3 to 20 carbon atoms selected from the class consisting of alkylene, cycloalkylene and alkoxyalkylene groups and hydroxyl-substituted derivatives thereof, the ketal bonds of said organic radical being on at least the 3-position in said R group with respect to each other.

5. A polyketal as in claim 4 in which X is chlorine.

6. An open-chain polyketal consisting essentially or recurring units of the structure:

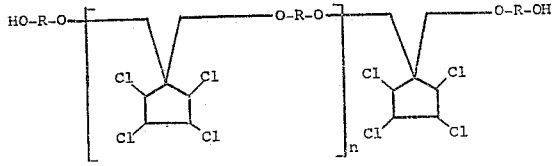

where $n$ is 1 to 100 and R is an organic radical having 3 to 20 carbon atoms selected fro mthe class consisting of alkylene, cycloalkylene and alkoxy-alkylene groups, the ketal bonds of said organic radical being on at least the 3-position in said R group with respect to each other.

7. A method of producing a compound of the formula:

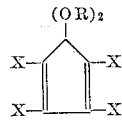

where X is selected from the group consisting of chlorine and bromine and R is an organic radical containing 3 to 20 carbon atoms selected from the class consisting of hydroxyl-substituted members of the group consisting of alkyl, cycloalkyl, and alkoxyalkyl radicals, said hydroxyl substituents being the sole reactive functional substituents on said radicals, all hydroxyl groups in said radical being in at least the 3-position with respect to the ketal oxygen, which comprises reacting a hexahalocyclopentadiene wherein the halogen atoms are selected from the group consisting of chlorine and bromine with a polyol having at least two hydroxyl groups separated by at least 3 carbon atoms selected from the group consisting of saturated aliphatic polyols, saturated alicyclic polyols, and polyalkylene glycols containing 3 to 20 carbon atoms, in the presence of a base and using in execess of two moles of said polyol per mole of hexahalocyclopentadiene.

8. A method in accordance with claim 7 in which there are present about 2 moles of said base per mole of hexahalocyclopentadiene.

9. A method as in claim 7 in which the hexahalocyclopentadiene is hexachlorocyclopentadiene.

10. A method which comprises reacting:
   (1) a hexahalocyclopentadiene wherein the halogen atoms are selected from the group consisting of chlorine and bromine, with
   (2) a saturated aliphatic polyol containing 3 to 20 carbon atoms, said polyol having at least 2 hydroxyl groups separated by at least 3 carbon atoms,
   (3) in the presence of a base, using an excess of 2 moles of said polyol per mole of hexahalocyclopentadiene.

11. A method as in claim 10 in which there are present about 2 moles of said base per mole of hexahalocyclopentadiene.

12. A method as in claim 10 wherein the hexahalocyclopentadiene is hexachlorocyclopentadiene.

13. A method of producing a linear polyketal which comprises reacting a hexahalocyclopentadiene wherein halogen atoms are selected from the group consisting of chlorine and bromine with a polyol, said polyol selected from the group consisting of saturated aliphatic polyols, saturated alicyclic polyols, and polyalkylene glycols containing 3 to 20 carbon atoms having at least 2 hydroxyl groups separated by at least three carbon atoms in the presence of a base and using at least one mole of hexahalocyclopentadiene for each 2 moles of polyol.

References Cited
UNITED STATES PATENTS

| | | | |
|---|---|---|---|
| 2,562,893 | 8/1951 | Dawson et al. | 260—611 |
| 2,697,103 | 12/1954 | Ordas | 260—611 X |
| 3,060,137 | 10/1962 | Gemeinhardt et al. | 260—2.5 |
| 3,072,727 | 1/1963 | Howard et al. | 260—611 |
| 3,075,926 | 1/1963 | Steward et al. | 260—2.5 |
| 3,084,200 | 4/1963 | Leigh | 260—611 |

OTHER REFERENCES

Newcomer et al., Jour. Amer. Chem. Soc., vol. 71 (1949), pp. 946–950.

BERNARD HELFIN, *Primary Examiner.*

D. E. CZAJA, L. ZITVER, *Examiners.*

J. J. KLOCKO, *Assistant Examiner.*